United States Patent [19]
Föhl

[11] Patent Number: 5,405,180
[45] Date of Patent: Apr. 11, 1995

[54] TRIGGER MECHANISM FOR BELT PRETENSIONER

[75] Inventor: Artur Föhl, Schorndorf, Germany

[73] Assignee: TRW Repa GmbH, Alfdorf, Germany

[21] Appl. No.: 929,175

[22] Filed: Aug. 11, 1992

[30] Foreign Application Priority Data

Aug. 16, 1991 [EP] European Pat. Off. ............ 91113775

[51] Int. Cl.⁶ ............................................. B60R 22/46
[52] U.S. Cl. ..................................... 297/478; 280/806
[58] Field of Search ................. 297/478, 480; 280/806, 280/802

[56] References Cited

U.S. PATENT DOCUMENTS

| | | |
|---|---|---|
| 3,241,205 | 3/1966 | Genin . |
| 4,447,017 | 5/1984 | Inukai ................... 297/480 |
| 4,913,497 | 4/1990 | Knabel ................... 280/806 |
| 4,917,210 | 4/1990 | Damicek et al. . |
| 4,948,171 | 8/1990 | Knabel et al. . |
| 5,149,128 | 9/1992 | Föhl ...................... 280/806 |
| 5,149,134 | 9/1992 | Föhl ...................... 280/806 |
| 5,265,813 | 11/1993 | Föhl ..................... 280/806 |

FOREIGN PATENT DOCUMENTS 3234422  3/1984 Germany .
4027342  4/1991 Germany .

*Primary Examiner*—Flemming Saether
*Attorney, Agent, or Firm*—Tarolli, Sundheim & Covell

[57] ABSTRACT

A trigger mechanism for a belt pretensioner comprises a sensor mass which responds both on a head-on collision and on ramming of the vehicle from the rear. The sensor mass may be pivotally mounted and formed by functional parts of the pretensioner drive. In a belt pretensioner which is combined with a belt retractor (10) to an assembly and which has a pyrotechnical piston/cylinder drive, the sensor mass consists of a carrier block (40) pivotally mounted on a base (12) and having a guide cylinder (42) mounted therein and a piston accommodated therein. A striker lever (50) pivotally mounted in the base (12) is released for activating an impact igniter on a gas generator cartridge (44) when the carrier block (40) is pivoted in vehicle-sensitive manner in the one or other direction.

2 Claims, 5 Drawing Sheets

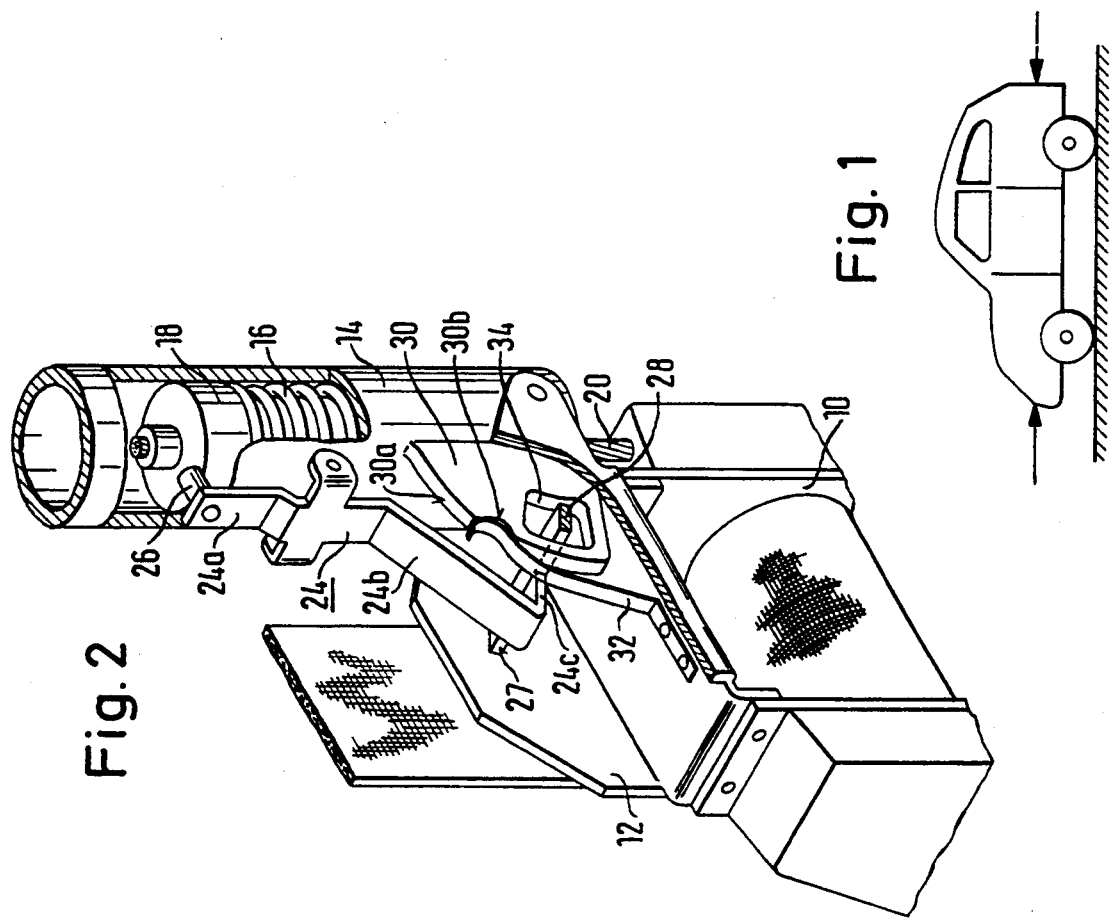
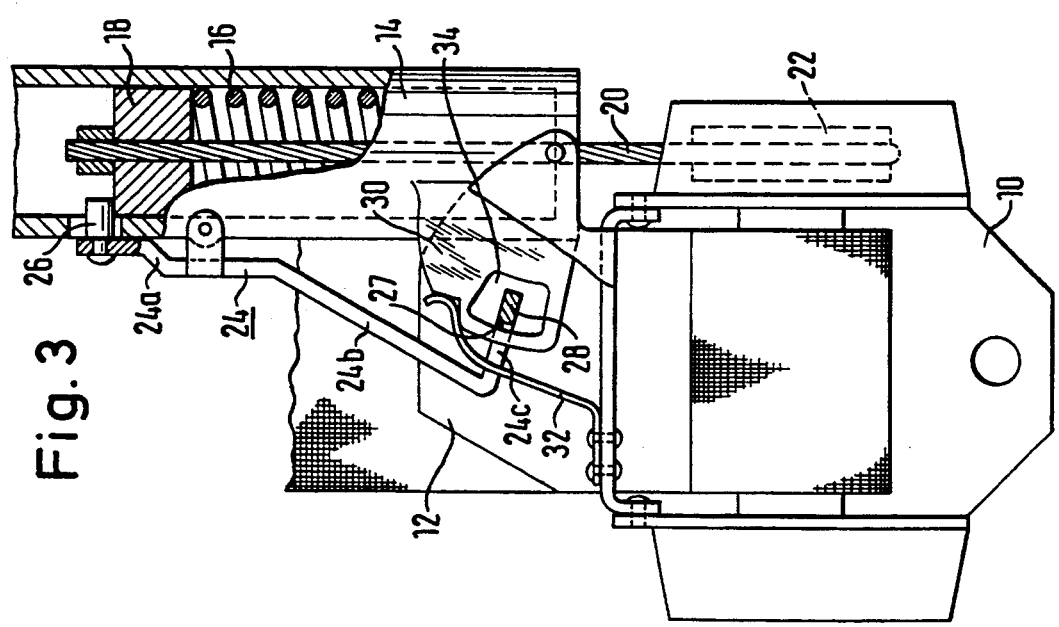

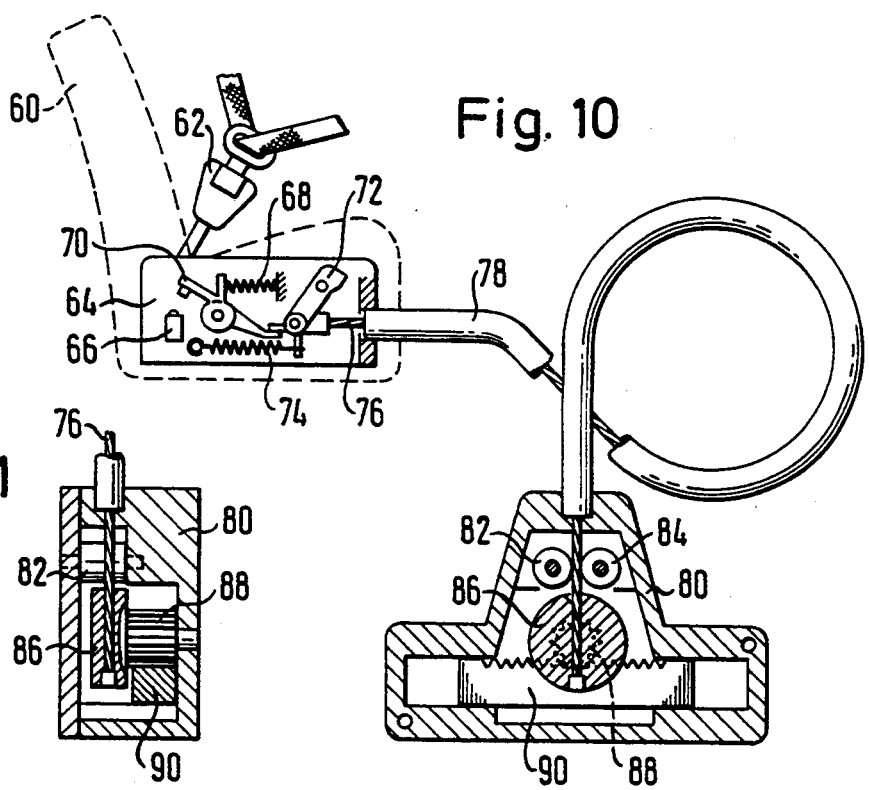
Fig. 10
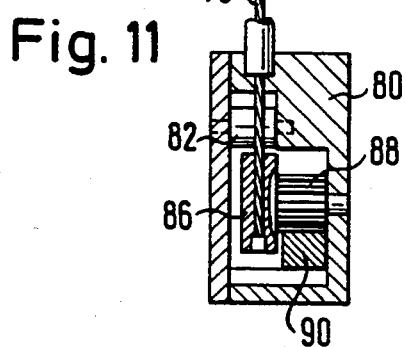
Fig. 11
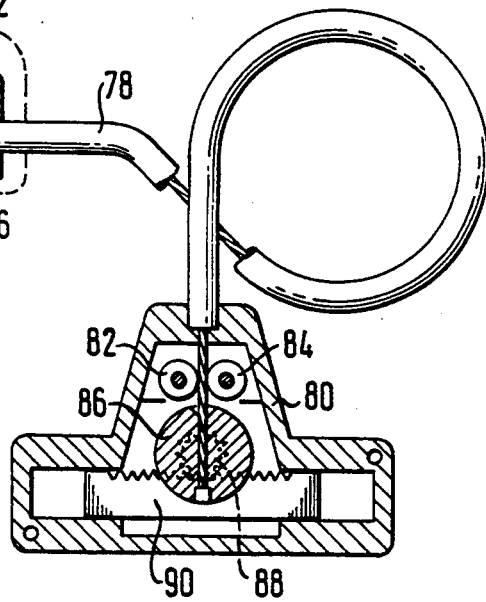
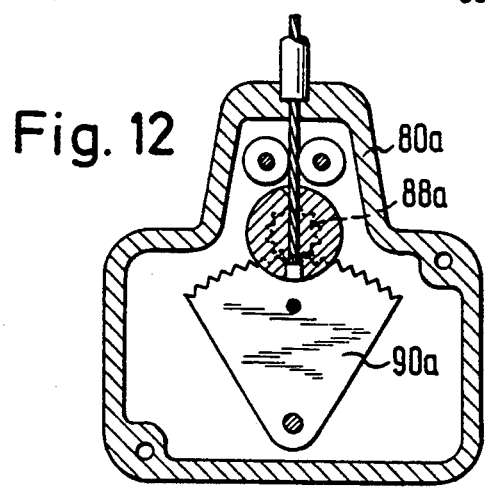
Fig. 12
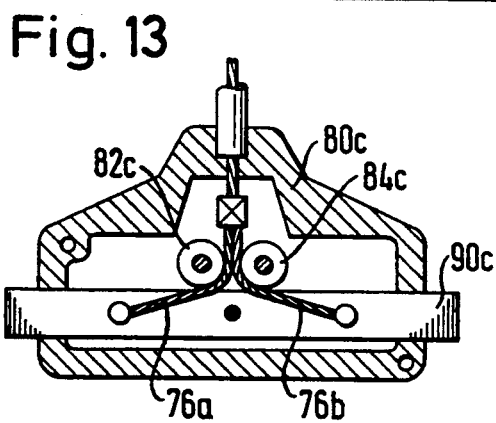
Fig. 13
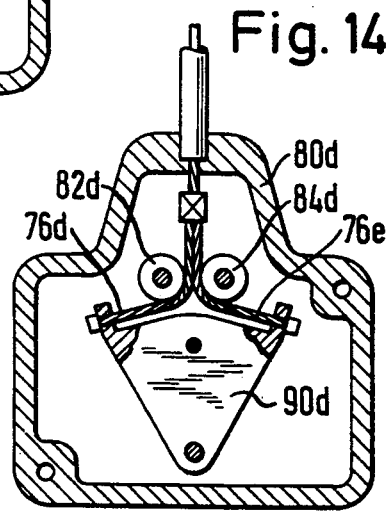
Fig. 14

TRIGGER MECHANISM FOR BELT PRETENSIONER

The invention relates to a trigger mechanism for belt pretensioners in safety belt restraining systems for vehicles, comprising a movably mounted sensor mass which is held in a rest position and is movable out of said rest position in vehicle-sensitive manner.

Such a trigger mechanism is suitable both for pyrotechnical piston/cylinder drives and for mechanical spring drives in belt pretensioners. Conventionally, the sensor mass is movable out of its rest position into a triggering position. The movement of the sensor mass into the triggering position takes place due to its mass inertia on a vehicle deceleration of such a magnitude that a head-on collision of the vehicle must be assumed.

The invention is based on the knowledge that an improved protective effect of the safety belt system is achieved if the belt pretensioner is also activated when the vehicle is rammed from behind. It has been found that with acceptable expenditure a trigger mechanism can be designed so that triggering takes place both on a head-on collision and when the vehicle is rammed from behind.

Thus, the invention makes available a trigger mechanism of the type set forth above and which is distinguished in that the sensor mass is movable into at least two trigger positions which are situated on either side of the rest position and the first of which is associated with a head-on collision and the second with a collision in which the vehicle is rammed from behind. The sensor mass may be arranged for pivotal or translational movement. The trigger mechanism may be arranged directly on a belt retractor/pretensioner unit. It is suitable both for pyrotechnical piston/cylinder drives and for mechanical spring drives of the belt pretensioner. Furthermore, embodiments are provided in which the belt pretensioner is arranged on a vehicle seat and acts on the belt buckle anchored to the vehicle seat. In these embodiments the sensor mass is arranged in a separate housing and is in operative connection with the trigger member of the belt pretensioner via a sheathed cable. The housing is mounted on the vehicle bodywork, for example on the vehicle floor beneath the seat. Thus, jolts which may occur on longitudinal adjustment of the vehicle seat cannot lead to unintentional activation of the belt pretensioner.

If the belt pretensioner is to be activated also when the vehicle is rammed from the side, the sensor mass is formed as pendulum deflectable in all directions.

These and further advantageous embodiments of the invention are set forth in the subsidiary claims.

Further features and advantages of the invention will be apparent from the following description of several embodiments and from the drawings to which reference is made and in which:

FIG. 1 shows schematically a vehicle for which the indicating arrows denote a head-on collision and a rear ramming;

FIG. 2 is a partially broken-away, partially sectioned perspective fragmental view of a belt retractor having an incorporated belt pretensioner in a mechanical embodiment with spring drive;

FIG. 3 is a partially sectioned, partially broken-away fragmental side view of the assembly shown FIG. 2;

FIG. 10 is a schematic illustration of a belt pretensioner which is arranged on a vehicle seat and which via a sheathed cable is in operative connection with a sensor mass arranged in a separate housing illustrated in section;

FIG. 11 shows a section of the housing illustrated in FIG. 10 along a plane turned through 90° with reference to FIG. 10;

FIGS. 12 to 14 show various embodiments of a sensor mass arranged in a separate housing;

Figure 4:
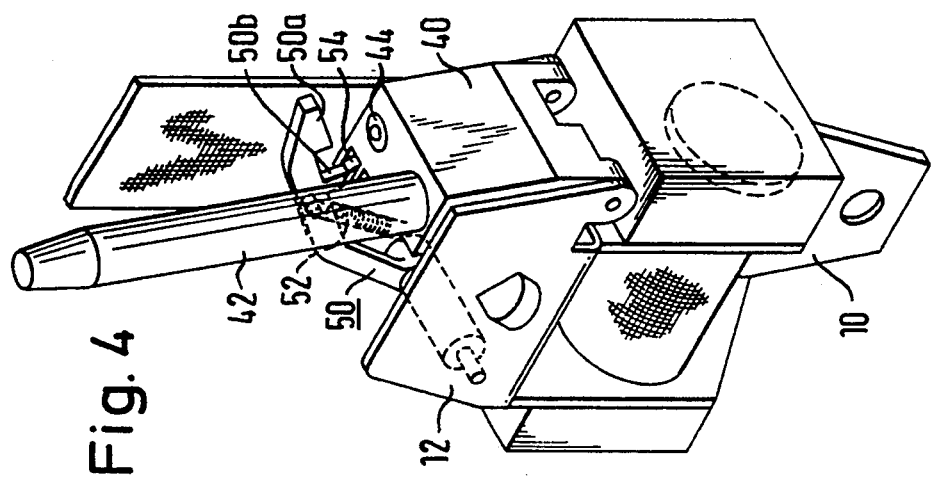
FIG. 4 is a perspective view of a belt retractor having an incorporated belt pretensioner which has a pyrotechnical piston/cylinder drive.
Figure 5:
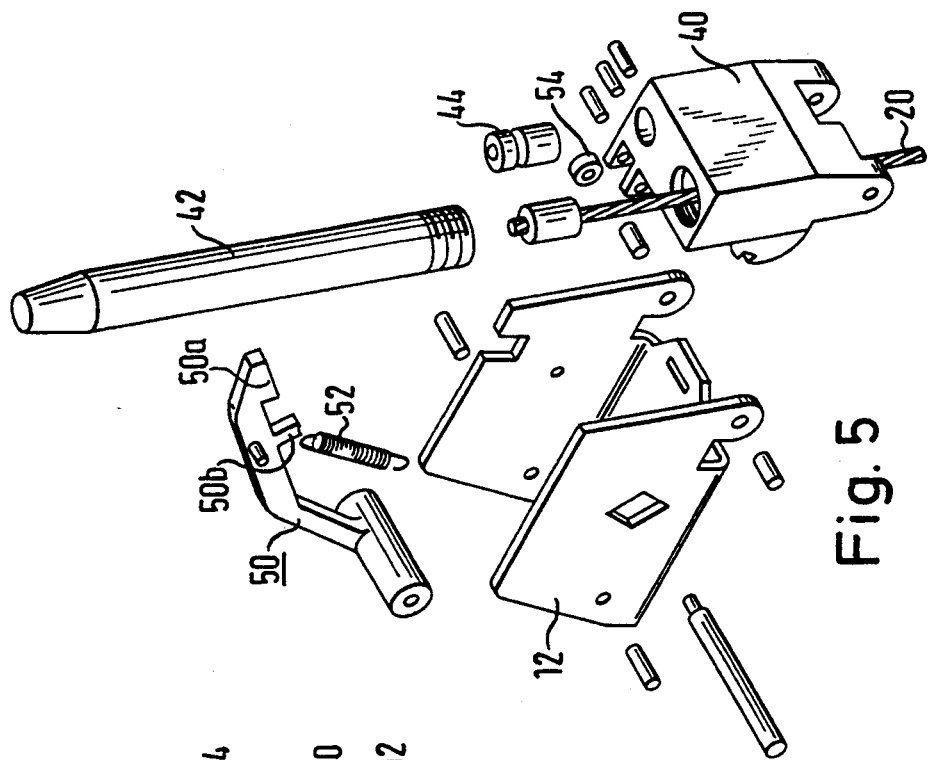
FIG. 5 is an exploded view of the assembly shown in FIG. 4.

In FIG. 1 the directions of the head-on collision and the ramming from the rear are symbolically represented by arrows for a vehicle. The embodiments of the trigger mechanism described ensure activation of a belt pretensioner both on a head-on collision and on ramming from the rear.

In the embodiment shown in FIGS. 2 and 3 a mechanical belt pretensioner is combined with a belt retractor to form an assembly. Mounted on the housing of the belt retractor denoted generally by 10 is a base 12 U-shaped in cross-section, between the legs of which a guide tube 14 is pivotally mounted at its one end. A pressure spring 16 held in the cocked state is accommodated in said guide tube 14. The pressure spring 16 acts on a piston 18 which is also accommodated in the guide tube 14 and to which a pulling cable 20 is anchored which engages the periphery of a pulley 22 which is adapted to be coupled to the belt spool. A two-armed locking lever 24 is pivotally mounted on the guide tube 14. At the end of its first shorter arm 24a the locking lever 24 carries a holding nose 26 which engages the end face of the piston 18 and via the latter holds the pressure spring 16 in its cocked state. At its second longer arm 24b the arresting lever 24 is bent towards the guide tube and bears with its bent end 24c on a holding surface 27 which is formed on a web 28 held between the two parallel legs of the base 12. A cam disc 30 is attached to the pivotally mounted end of the guide tube 14. Said guide disc 30 comprises a cam face 30a having a notch 30b. The arcuately curved free end of a leaf spring 32 engages into said notch 30b and the other end thereof is secured to the bottom of the base 12. The cam disc 30 is provided with a window 34 for free passage of the web 28.

FIGS. 2 and 3 show the arrangement in its rest position. The pressure spring 16 forms with the guide tube 14 and all the parts connected thereto a vehicle-sensitive sensor mass which is deflectable in two opposite directions in response to retardation and acceleration. The locking lever 24 is subjected by the pressure spring 16 to an opening moment, which means that the locking lever 24 tends to be pivoted in a direction such that the holding nose 26 releases the piston 18. The bent end 24c of the locking lever 24 is however supported on the holding surface 27 of the web 28. The arrangement is held in this rest position by the leaf spring 32 engaging with its free end into the notch 34 of the cam disc 30. When however a deceleration or acceleration occurs in the direction of travel or in the direction opposite thereto and has a magnitude which indicates that a collision is taking place, the leaf spring 32 yields and permits pivoting of the guide tube 14. The bent end 24c of the locking lever 24 now slides over the holding surface 27 and beyond the limit edge thereof, whereupon the locking lever 24 loses its support and is released. The pressure spring 16 cain now suddenly expand and move the piston 18 up in the guide tube 14, said piston in turn, via the pulling cable 20, setting in rotation the pulley 22 and the belt spool entrained therewith via a coupling. On either side of its holding surface 27 the web 28 forms a recess at which the support of the locking lever 24 is cancelled. Furthermore, the guide tube 14 is pivotal out of its rest position in both directions. The release mechanism thus responds both to a head-on collision and to ramming from the rear.

In the embodiment shown in FIGS. 4 to 9 a belt pretensioner is again combined with a belt retractor 10 to form an assembly. The belt pretensioner comprises however a pyrotechnical piston/cylinder drive.

Figure 6:
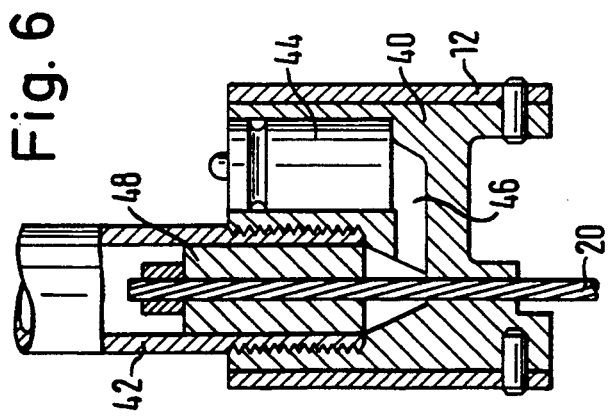
FIG. 6 is a partial section of the assembly shown in FIGS. 4 and 5.

A carrier block 40 is pivotally mounted between the two parallel legs of a base 12 secured to the housing of the belt retractor 10. The threaded end of a guide cylinder 42 is screwed into a bore of the carrier block 40. A gas generator cartridge 44 with impact igniter is inserted into a further bore of the carrier block 40. As shown in FIG. 6, these two bores are in communication via a passage 46. In the interior of the guide cylinder 42 a piston 48 is accommodated which is adapted to be subjected to the gases generated by the gas generator cartridge 44 and introduced via the passage 46 and engages a pulling cable 20. A striker lever 50 is also pivotally mounted at its one end between the two legs of the base 12. At its other end, said striker lever 50 carries an anvil 50a. Said striker lever 50 is biased by a tension spring 52 connected between the base 12 and a pin inserted into the striker lever 50 so that the latter tends to pivot in the clockwise direction. However, with its support arm 50b projecting approximately perpendicularly in the vicinity of the anvil 50a said lever bears on a holding roller 54 which is mounted for easy rotation on the carrier block 40. This supporting of the striker lever 50 keeps the anvil 50a at a distance above the impact igniter of the gas generator cartridge 44 for as long as the arrangement is in its rest state. As is apparent from FIGS. 7 to 9, the support arm 50b has at its free end a concave support surface adapted to the surface of the holding roller 54. This support surface may be curved or notch-like; the response threshold of the trigger mechanism can be influenced via the angle of the notch. Furthermore, the support arm 50b is slightly curved with a radius of curvature corresponding substantially to the distance between the pivot mounting of the striker lever 50 and the holding roller 54.

Figure 7:
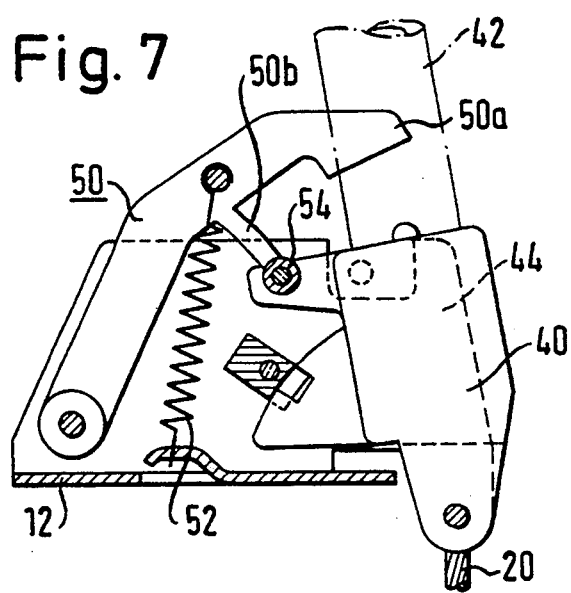
FIGS. 7, 8 and 9 show the trigger mechanism of the assembly illustrated in FIGS. 4 to 6 in various functional states.
Figure 8:
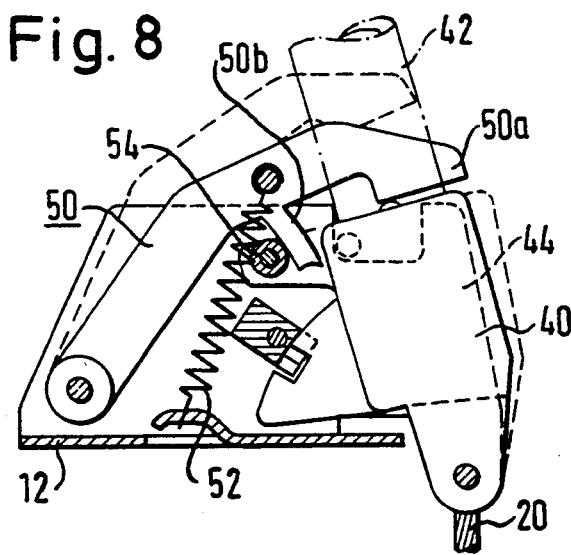

FIG. 7 shows the trigger mechanism in its rest position. The carrier block 40 with the guide tube 42 and piston 48 and all the parts mounted on the carrier block 40 forms the sensor mass of the trigger mechanism. This sensor mass is held in its position shown in FIG. 7 by the tension spring 52. However, at a deceleration or acceleration exceeding a predetermined magnitude the sensor mass is pivoted in the one or other direction. On pivoting anticlockwise, as shown in FIG. 8, the support arm 50b first runs up the holding roller 54 and then again returns to its rest position when the inertia forces no longer increase. If the inertia forces continue to rise, however, the concave end of the support arm 50b moves over the surface of the holding roller 54 up to a point at which said roller can no longer hold the support arm and the latter slides down the roller and finally engages behind the latter. The tension spring 52 now accelerates the striker lever 50 until the anvil 50a strikes the impact igniter of the gas generator cartridge 44. The gases now liberated drive the piston 48 up in the guide cylinder 42 and entrain the pulling cable 20, the tightening thereby being effected in the same manner as in the embodiment according to FIGS. 2 and 3.

Figure 9:
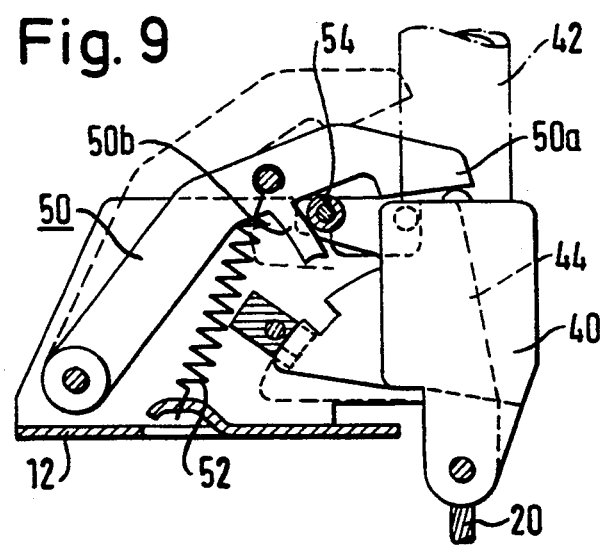

FIG. 9 shows the analogous triggering operation when the sensor mass is pivoted in the opposite direction. Since the holding roller 54 is held at a distance from the carrier block 40, the support arm 50b can slide downwardly both in front of said holding roller and behind the latter. The arcuate form of the support arm 50b ensures that the striker lever 50 is not obstructed in its pivot movement by the holding roller 54 so that it can be accelerated without any problems by the tension spring 52 in order to acquire the impulse necessary for activating the impact igniter.

The embodiment shown in FIG. 10 is designed for a vehicle seat 60 with a buckle 62 anchored thereto and a belt pretensioner 64 connected with buckle 62. This belt pretensioner also has a pyrotechnical piston/cylinder drive, of which only a gas generator cartridge 66 with impact igniter and a pivotally mounted striker lever 70 biased by a spring 68 are schematically shown. Also illustrated is a pivotally mounted trigger lever 72 which is held by a tension spring 74 in a rest position in which the striker lever 70 bears thereon. The one end of the inner cable 76 of a sheathed cable 78 engages the free end of said trigger lever 72. The other end of the inner cable 76 is led through an opening in a separate housing 80 into the interior thereof. It runs between two oppositely arranged guide rollers 82, 84, mounted for free rotation, through a diametrical bore to the lowest point at the outer periphery of a flange 86 which is integrally connected to a pinion 88 rotatably mounted in the housing 80 and has a greater outer diameter than the latter. The pinion 88 is in meshing engagement with a rack on a sensor mass 90 guided for translational movement in the housing 80. The direction of movement of the sensor mass 90 corresponds to the travelling direction of the vehicle. The sensor mass 90 is displaceable in the housing 80 both in the travelling direction and in the direction opposite thereto. By the tension spring 74 and via the pulling cable 78 the sensor mass 90 and the pinion 88 are held in their rest position. The sensor mass 90 is shifted and sets the pinion 88 in rotation only on occurrence of a deceleration or acceleration in the one or other direction. The inner cable 76 is led through a diametrical bore in the flange 86 and consequently is bent immediately on start of the rotation off the flange 86, being supported by one of the guide rollers 82, 84 so that a shortening of the cable section between the housing 80 and the belt pretensioner 64 occurs. Since the end of the inner cable 76 is connected to the trigger lever 72, the latter is pivoted anticlockwise in FIG. 10 until it finally releases the striker lever 70. The latter is accelerated by the pressure spring 68 and strikes with its anvil against the impact igniter of the gas generator cartridge 66, thereby activating the belt pretensioner.

Since the outer diameter of the flange 86 is greater than that of the pinion 88, even a small deflection of the sensor mass 90 leads to a significant shortening of the cable portion between the housing 80 and belt pretensioner 64. The transmission ratio can be set to the particularly optimum value within a wide range by dimensioning of the diameter ratio between the flange and pinion.

FIG. 12 shows a constructional variant in which the sensor mass 90a is pivotally mounted in the separate housing 80a. Said mass is also provided with a toothing which is in meshing engagement with the pinion 88a.

FIG. 13 again shows an embodiment having a translationally displaceable mass 90c in a separate housing 80c. The inner cable 76 led into the housing 80c branches in front of the guide rollers 82c, 84c into two cable portions 76a, 76b. The ends of the cable portions 76a, 76b are secured to the sensor mass 90c at oppositely disposed points of said mass located symmetrically with respect to the perpendicular centre line of the housing 80c. They are deflected by the deflecting rollers 82c, 84c through an angle of appreciably more than 45° and slightly less than 90°. The closer the deflection angle is to 90°, the greater the shortening of the inner cable between the housing 80 and the belt pretensioner 64 for a given travel of the sensor mass 90c.

A further constructional variant is shown in FIG. 14. In this embodiment as well the sensor mass 90d is pivotally mounted in the housing 80d. As in the embodiment according to FIG. 13, the inner cable 76 branches in front of the guide rollers 82d, 84d into two cable portions 76d, 76e which are deflected by said guide rollers. The ends of said cable portions 76d, 76e are each introduced through a bore in a lug of the sensor mass 90d and secured on the opposite side by a pressed-on nipple or the like. The cable portions 76d, 76e run with clearance through the respective bore and extend away from the respective lug of the sensor mass 90d approximately perpendicularly. Fundamentally, since they are relatively highly deflected at the guide rollers the cable portions 76a to 76e should be as flexible as possible to ensure sensitive response to movements of the sensor mass. With the type of connection of the cable portions 76d and 76e to the sensor mass 90d illustrated in FIG. 14 a sensitive response is achieved even with relatively low flexability of the cable portions.

Figure 15:
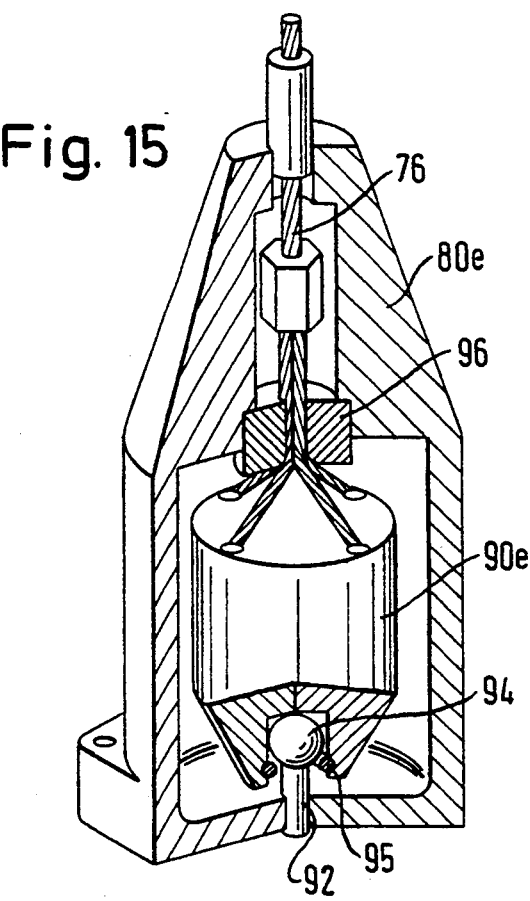
FIG. 15 is a partial view in perspective and in section of an embodiment in which the sensor mass is configured as an inverted pendulum and is deflectable in all directions.

FIG. 15 shows an embodiment in which a sensor mass 90e is mounted pivotally in all directions in the form of an inverted pendulum in a separate housing 80e. A pin 92 projects from the bottom of the interior of the housing 80e and carries at its free end a ball 94 on which the sensor mass 90e is pivotally mounted by means of a matching borne in the manner of a ball joint. The sensor mass 90e is secured on the ball 94 by a ring 95 which engages behind said ball and is inserted into the bore. The end of the inner cable 76 introduced into the interior of the housing 80e branches in front of a guide eye 96 into four cable portions which are secured at equal angular intervals to time outer periphery of the sensor mass 90e. This embodiment is also intended for cooperation with the belt tightener illustrated in FIG. 10 but differs from the embodiments hitherto described essentially in that the sensor mass 90e responds equally to accelerations or decelerations in all directions.

Figure 16:
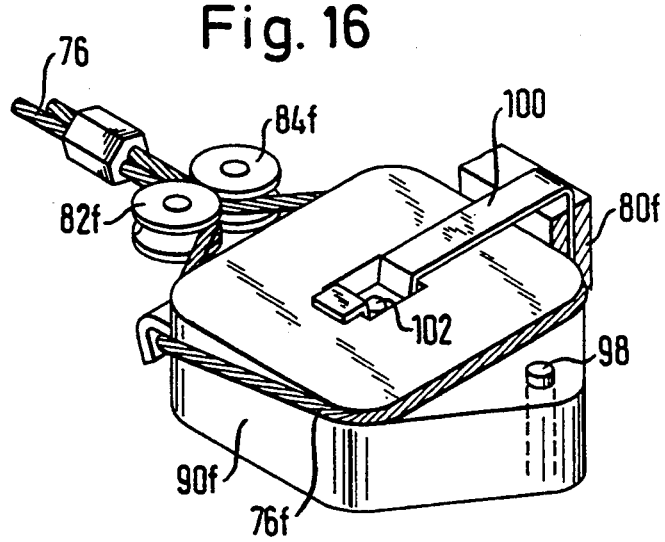
FIG. 16 shows an advantageous embodiment having a pivotal sensor mass and a pulling cable wrapped round the latter.
Figure 17:
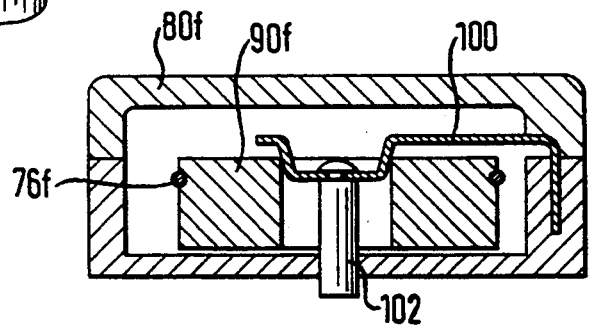
FIG. 17 is a sectional view of an embodiment having a sensor mass which can be locked in its rest position by assembly securing means.

A particularly advantageous embodiment is shogun in FIGS. 16 and 17, In a separate housing 80f a sensor mass 90f is mounted pivotally on a pin 98. A leaf spring 100 is anchored with its one end in a side wall of the housing 80f. The other end of the leaf spring 100 is provided with a downwardly directed bent portion which engages into a through recess of the sensor mass 90f and carries a sensing pin 102 which is led through a bore in the bottom wall of the housing 80f and projects a few millimeters from said bore. The end of the inner cable 76 introduced into the interior of the housing 80f is formed to a loop which is placed in a groove of the sensor mass 90f and surrounds the latter. The cable portions of said loop extend parallel to each other up to the guide rollers 82f, 84f and are thereafter deflected by the latter. The sensor mass 90f is secured in its rest position by the bent portion of the leaf spring 100 engaging into the recess of the sensor mass 90f for as long as the housing 80f is not mounted on the vehicle bodywork, for example on the floor beneath a vehicle seat. On mounting of the housing 80f the sensing pin 102 is pushed into the interior of the housing 80f, thereby pressing up the leaf spring 100 and its bent portion until the sensor mass 90f is freed. The trigger mechanism is then ready for activation.

I claim:

1. A trigger mechanism for a belt pretensioner in a safety belt restraining system for a vehicle, comprising:

a movably mounted sensor mass which is held in a rest position, said sensor mass being movable into at least two trigger positions which are situated on either side of the rest position, a first one of the trigger positions being associated with a head-on vehicle collision and a second one being associated with a collision in which the vehicle is rammed from behind, said sensor mass being pivotal between the first and second triggering positions in a common plane, said sensor mass being formed by a movable assembly which includes a biasing pressure spring and a guide tube accommodating said pressure spring to provide a mechanical belt pretensioner drive unit, said guide tube being pivotally mounted at a first end thereof on a base fixedly connected to a housing of a belt retractor; and a two-armed locking lever pivotally mounted on said guide tube and having a first, shorter arm which comprises at an end thereof a holding nose which engages an end face of a piston subjected to said pressure spring, and a second, longer arm which has a free end supported on a holding surface provided on said base.

2. The trigger mechanism according to claim 1, wherein said guide tube comprises at its pivotally mounted end a cam face which is provided with a notch into which a free end of a leaf spring secured to said base engages under bias, said notch being arranged at a location on said cam face corresponding to said rest position.

* * * * *